United States Patent [19]

Angst

[11] 4,178,537
[45] Dec. 11, 1979

[54] SYSTEM FOR THE PRODUCTION OF AN ADDITIONAL ROTATIONAL MOTION OF A HELICALLY TOOTHED GEAR WORKPIECE IN A POSITIVELY CONTROLLED GEAR PROCESSING MACHINE

[75] Inventor: Arthur Angst, Wil, Switzerland
[73] Assignee: Reishauer AG, Zurich, Switzerland
[21] Appl. No.: 904,969
[22] Filed: May 11, 1978
[30] Foreign Application Priority Data
  Jun. 1, 1977 [DE] Fed. Rep. of Germany ....... 2724664
[51] Int. Cl.$^2$ ........................................... G05B 19/28
[52] U.S. Cl. .................................. 318/603; 318/571; 409/12; 409/15
[58] Field of Search ...................... 318/602, 603, 571; 90/4

[56] References Cited
U.S. PATENT DOCUMENTS

| 4,066,944 | 1/1978 | Leenhouts ........................... 318/571 |
| 4,082,031 | 4/1978 | Hodgson et al. ........................ 90/4 |
| 4,107,592 | 8/1978 | Bayer .................................... 318/603 |
| 4,136,302 | 1/1979 | Tlaker et al. ........................ 318/571 |

Primary Examiner—B. Dobeck
Attorney, Agent, or Firm—Sughrue, Rothwell, Mion, Zinn and Macpeak

[57] ABSTRACT

The present invention relates to a method and apparatus for the production of an additional rotational motion of a helically toothed gear workpiece in an electronically, positively controlled gear processing machine operating according to the hobbing method which has separate rotating drives for workpiece and tool. In this process, a series of impulses are supplied to a controller. These impulses are compared to each other for the production of a control signal for the readjustment of the workpiece drive. The series of impulses are dependent upon the rate of rotation of each of the drives. An additional signal is supplied which is derived from the longitudinal advance of the workpiece in relation to the tool.

12 Claims, 7 Drawing Figures

SYSTEM FOR THE PRODUCTION OF AN ADDITIONAL ROTATIONAL MOTION OF A HELICALLY TOOTHED GEAR WORKPIECE IN A POSITIVELY CONTROLLED GEAR PROCESSING MACHINE

BACKGROUND OF THE INVENTION

It is known that a gear workpiece always has to carry out an additional rotational movement during grinding of helically toothed gears in the hobbing method. This is true as well as in the analog hobbing method in the case of axial relative movement in respect of the grinding and cutting tool, i.e., in the execution of the oscillating feed movements in two-way operations or of the feed and return movements in case of the one-way operation which depends on the module, the number of teeth and the pitch helix angle. This additional rotational movement has to be additively or subtractively superimposed on the rotating movement of the gear workpiece as it would correspond to a straight toothed gear, dependent upon the direction of the relative longitudinal feed movement between the workpiece and the tool.

As shown in German Patent No. 1 248 964, an electronic hobbing machine control has been proposed, in which pulse sequences are derived from the axle of the hob and the axle of the workpiece. These pulse sequences are dependent upon the rpm. They have a specific relationship to each other for a certain tooth number of the gear to be hobbed, in order to attain a direct transmission, for which purpose either pulse dividers or multipliers may be provided for the pulse sequences. The two pulse sequences are compared to each other and a control signal is produced from the comparison for the readjustment of the workpiece drive, so that a positive drive of the workpiece drive is present, in dependence on the hob drive. In order to attain the additional rotational motion that is required for a helical gear workpiece, additional pulses are produced that are supplied to the one pulse sequence, either additively or subtractively.

The additional pulses can, for instance, be derived from the feed shaft for the milling carriage. Such pulse addition or subtraction corresponds, in its effect, to that of a known mechanical differential in hobbing machines for the consideration of the pitch helix angle and which is therefore often called an electrical or electronic differential.

German Patent No. 22 55 514 discloses a gear grinding machine with an electrically controlled workpiece spindle drive and which uses the above mentioned method for the production of additional pulses for the obtention of the additional rotational movement for the helically toothed workpiece. In this machine, the determination and superimposition of the additional rotational movement takes place in a mechanical-electronic manner by measuring the distance of the workpiece carriage carrying out the feed movement in an indirect manner, i.e., by way of a ball rollspindle unit in which the ball rollspindle is coupled to a rotary shaft encoder. The pulses produced are supplied by way of a frequency divider circuit to a coordination circuit which contains a digital-analog converter, which also receives the rpm-dependent pulses of the workpiece, i.e., of the grinding wheel and of the workpiece. By the application of a ball rollspindle unit for the distance measurement (way measurement), one must count, even in the most favorable case, with a transmission error of 0.002 to 0.003 mm, which is too high for tooth flank grinding of highly precise tooth gears. Further imprecisions occur, because in the coordinating circuit the pulse sequence of the workpiece carriage divided in the frequency and the multiplied and divided pulse sequence of the workpiece carriage and the multiplied and divided pulse sequence of the tool are compared directly with the pulse sequence of the workpiece.

Other succession controls that contain a digital travel measuring system with pulse multiplication are also known, such as, for example, an electronic modular system (Zeiss Informations, Oberkochen, No. 80/1972), in which the amplitude fluctuations of the sensed signal show themselves in measurement errors, or, for example, a pulse multiplication with a voltage-controlled oscillator (Roland Best, Theory and application of the phase-lock loop, Elektroniker, No. 10, 1976), in which the output signal is imbued with a drag error. These processes and measuring systems cannot, however, be applied to the tooth flank grinding of highly precise gears because they are either too imprecise or work too slowly.

SUMMARY OF THE INVENTION

It is the object of the present invention to produce a method that makes possible the input of pulse signals that follow in sufficient density in extremely short time periods, i.e., within 2 to 3 microseconds, of the longitudinal displacement of the workpiece in respect of the tool, that have been measured very precisely by a travel measuring (odometric) system, into the control system for the controlled travel of the workpiece, in the form of pulse superpositions and which considers constantly the continuously varying changes of the carriage speed. These changes are caused for reasons of continually changing cutting powers, unstable friction, increases or reductions of the carriage reversions, etc.

Accordingly, the method is characterized by the fact that standard pulses are produced which depend on the longitudinal workpiece feed, that a specific, constant number of intermediate pulses are produced after the beginning of each interval which is limited by two sequential standard pulses in timewise at least approximately equal sequence. Here the distance between the intermediate pulses in this interval is determined on the basis of the measurement of the length of the previous interval and of an at least approximately uniform distribution of the determined number of intermediate pulses for the measured interval period. Where, in each interval that is longer than the previous one, a pulse-free interval section is provided, after the last intermediate pulses that were produced and where in each interval that is shorter than the previous one, the superfluous intermediate pulses are fed to the controller as additional signals in the following interval between the beginning of the measurement pulse, formed by the following interval and the first sequential intermediate pulse, these are produced with a higher pulse sequence frequency and the sequences of the measurement pulses that are produced in all subsequent intervals as well as the intermediate pulses.

In the method of this invention, by the introduction of equally distributed intermediate pulses between every two standard pulses, the continually changing frequency of the pulses of the travel-measuring system can be determined within the shortest time and with high resolution and then be utilized for the additional rotational movement of the workpiece without further delay and inaccuracies. In addition, mechanical transmission errors are entirely avoided by a direct odometric system that produces standard pulses.

The invention also relates to a system to carry out the method and comprises a linear encoder with an optical measure and an attendant, measurement (standard) pulse producing a reading head for the longitudinal carriage of the gear hobbing device. According to the invention, the device is characterized by a pulse generator for the production of pulses of constant frequency which is larger than the frequency of the measurement pulses that have been multiplied by a certain constant number. A first switching means is used for the division of the pulses of the pulse generator by the specific known number and for the counting of the divided pulses during the interval located between a first and a second measuring pulse. A second circuit means is utilized for the division of the pulses of the pulse generator in each interval by the result of the counting of the first circuit. A third circuit is connected to the second circuit for the inclusion of the pulses produced by the second circuit in the measurement pulses. The third circuit contains gate circuits to block the pulses of the second circuit when their number in the interval between the second and the third measurement pulse reaches a constant number or for the addition of pulses of the pulse generator after the third measurement pulse, if, in the interval between the second and third measurement pulse, the number of pulses of the second circuit, does not reach the specific constant number.

The method and apparatus of this invention will be described in the following description of the preferred embodiment which acts as an electronic differential and on hand of some time-related impulse diagrams.

DESCRIPTION OF THE PREFERRED EMBODIMENT

Figure 1:
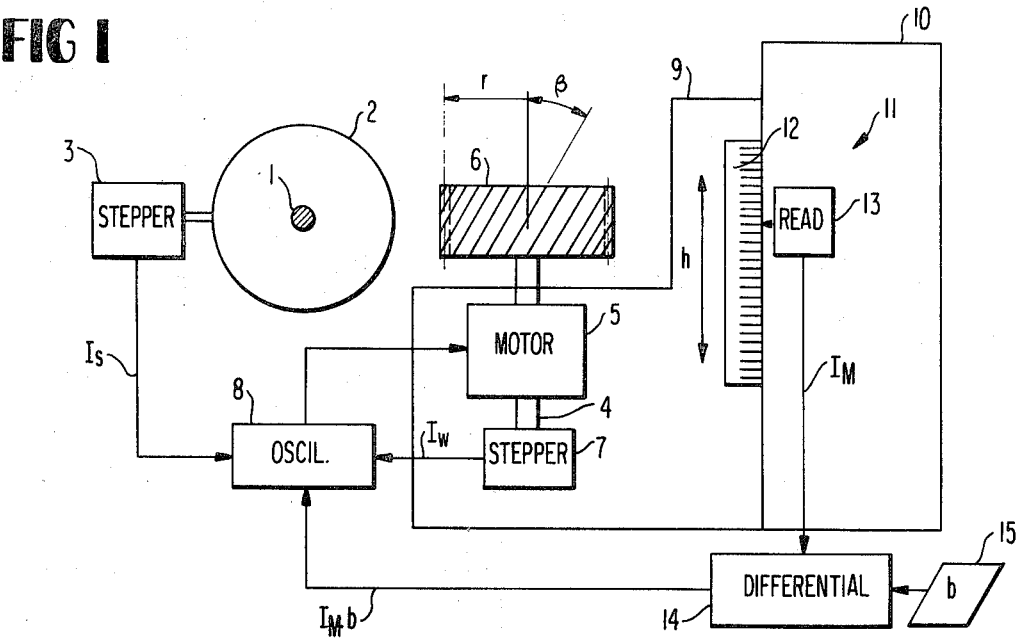
FIG. 1 shows a schematic presentation of the control system in a gear grinding machine with an arrangement for the production of the required additional rotational movement in hobbing of helically toothed gears.

Referring to FIG. 1, a gear grinding machine working according to the hobbing method is shown, in a generally known manner with an angular encoder 3 on a tool spindle 1, of a grinding worm 2, which produces a theoretical value pulse sequence $I_s$ in dependence on the rate of revolution of the grinding worm. In analogous manner, a second angular encoder 7 is attached on a workpiece spindle 4 of a workpiece motor 5, which, as a workpiece, drives a helically toothed gear 6, which angular encoder produces an actual-value pulse sequence $I_w$ in dependence on the rate of rotation of the motor 5 and, hence, the rate of rotation of the gear 6. The required and actual pulse sequences ($I_s$ resp. $I_w$) are fed to a controller 8 which contains an electrical unit in which, for example, the two pulse series are compared in respect of their respective phase positions, whereby, in lacking agreement of the pulse sequences, a signal is produced in controller 8 which is provided to the workpiece motor 5 for its readjustment. The number of threads of the grinding worm 2 as well as the tooth number of gear 6 are also fed in suitable manner into controller 8. This control system, that is not shown specifically, is provided in a known manner for the adjustment of a rotational drive of a straight toothed gear. A suitable controller is described in the Applicant's co-pending Application Ser. No. 904,968, filed May 11, 1978, entitled "Method and Apparatus for the Synchronization of a Gear Machining Apparatus."

For grinding of helically toothed gears an additional rotating movement must be produced and can take place, in a generally known manner, by means of a mechanical differential drive equipped with change gears or, preferably by means of the production of additional pulses supplied to the controller 8. A device for the production and addition of pulses acting on the additional rotational movement will be called an electronic differential in the following description and is specifically described with respect to FIG. 3.

In FIG. 1, a workpiece carriage 9 is carried by a support 10, which in turn carries out a feed-movement h of the gear 6 in the axial direction of the gear. For the production of the necessary travel information on the movement of the carriage 9 a digital linear encoder 11 is provided, which comprises of an optical measure 12 and the corresponding reading head 13, where the optical measure 12 is attached to carriage 9 and the reading head 13 on the housing of support 10. The reading head 13 produces travel dependently pulses $I_M$. Accordingly, the measurement of the movement of the carriage 9, and hence, of the gear 6, takes place directly on the carriage 9, i.e., without the need for mechanical transmission parts such as a tooth rack, ball bearing spindle and nut, tooth gear drives etc. Mechanical sources of error are, for that reason, practically eliminated.

The travel information arriving from the linear encoder 11 in the form of the pulses $I_M$ are provided to the mentioned electronic differential 14. The data required for the relationship between the carriage movement and the additional rotating movement are provided to the electronic differential 14, namely the module m, the number of teeth z and the pitch helix angle $\beta$ of the helical gear 6 that is to be ground whose double pitch circle radius r is known to be $m \times z / \cos \beta$. The mentioned data will be described as factor b.

For the production of the additional rotational movement, a certain relationship of the number of the actual value pulses $I_w$ of the workpiece, must be present in relation to the travel-dependently produced measurement pulses $I_M$ for each time unit. This relationship presented as factor b, can be calculated as follows:

$$b = \frac{I_w}{I_M} = \frac{N_w}{\pi \cdot m \cdot z \cdot q} \cdot \sin \beta \qquad (1)$$

where:

$I_w$ is the number of workpiece pulses per time unit, $I_w$ is the number of the measurement (standard, scale) pulses per time unit, $N_w$ is the number of workpiece pulses per revolution, q is the scale constant (number of pulses per meter).

The proper relationship is therefore produced by the calculation and adjustment of factor b.

Figure 3:
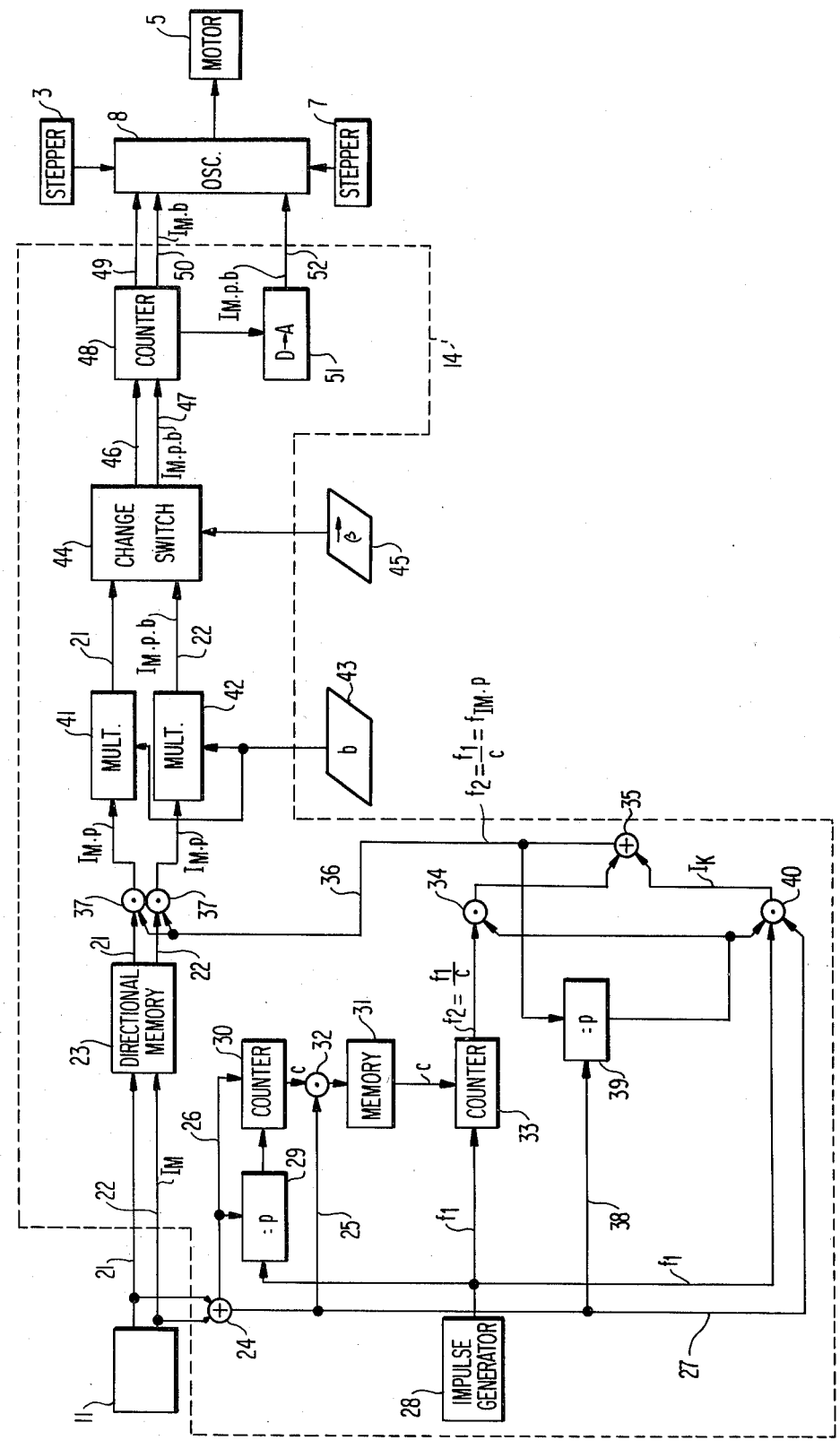
FIG. 3 is a block diagram of the device of FIG. 1 for the production of the additional rotational movement.

An adjustment device 15 shown schematically in FIG. 1 is provided for the input of factor b into the electronic differential 14, which will be further described with respect to FIG. 3. The pulses $I_M$ are used in the electronic differential 14 under consideration of factor b and inclusion of the helix direction of the teeth as well as the feed direction of the carriage, where, as will be described in the following, a preselectable multiplication of the travel pulses $I_M$ takes place for better resolution of the travel measurement.

The signal of the electronic differential 14, produced from this processing, is supplied to the controller 8 in the form of a pulse sequence $L_M \times b$, where the pulse sequence $I_M \times b$ is superimposed on the pulse sequence $I_w$ of the angular encoder 3 attached to the workpiece spindle 1 in order to produce in comparison with the pulse sequence $I_w$ of the workpiece drive, a signal that will influence the workpiece motor 5 which causes the necessary additional rotating movement in very precise manner.

According to the process of this invention, a constant number of intermediate pulses are produced with the beginning of each interval limited by two sequential measurement pulses $I_M$ of FIG. 1 in timewise at least approximately equal sequence. Hence, a preselectable multiplication of the measurement pulses $I_M$ of the linear encoder 11 of the carriage 9 carrying out the feed movement, takes place by a specific factor p, by introducing the corresponding number of p−1 intermediate pulses within the changeable period lengths of the sequential frequency of the pulses $I_M$ of the optical measure 12 in as equal a distribution as possible.

Since the changes in the speed of the carriage 9 takes place in relation to the line distances of measure 12 of the linear encoder 11 in a gradual manner, i.e., not abruptly, the determination of the appropriate distances of the p−1 intermediate pulses within a specific period length $T_{IM}(n)$ of the sequence of the measure pulses $I_M$ are carried out, according to this invention, on the basis of a measurement of the previous period length $T_{IM}(n-1)$. Since the period length $T_{IM}(n)$ for the distribution of the p−1 intermediate pulses will only in rare cases agree absolutely with the prior period length $T_{IM}(n-1)$, the introduction of the p−1 intermediate pulses takes place on the basis of whether a period length $T_{IM}(n)$ is greater or smaller than the previous period length $T_{IM}(n-1)$, according to this invention in the following described manner according to FIGS. 2a and 2b.

Figure 2A:
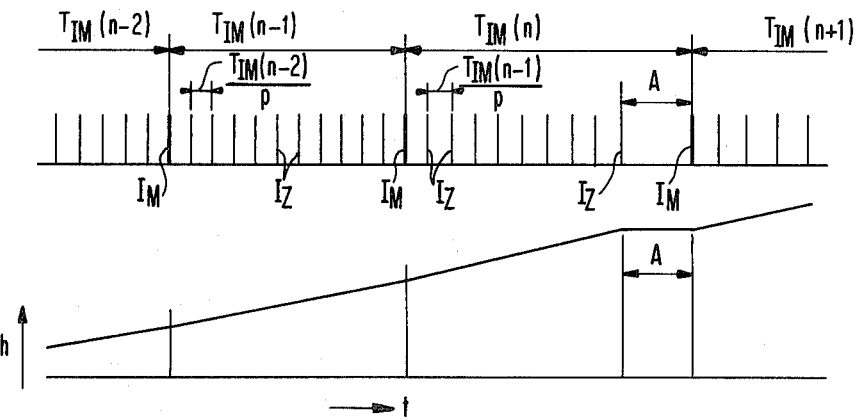
FIGS. 2a and 2b show time-related pulse diagrams of the measurement pulses and intermediate pulses produced in the method of this invention.

The graphic presentation of FIG. 2a is based on the case, in which a period length $T_{IM}(n)$ of the measurement pulses $I_M$, i.e., the interval between two sequential $I_M$ pulses is greater than the previous period length. In this case, a pulse-free residual period A is interjected according to this invention subsequent to the last of the intermediate pulses $I_Z$, distributed in the mentioned interval, whose position results from the previously determined time distance $T_{IM}(n-1)/p$ of the intermediate pulses $I_Z$, up to the appearance of the following measurement pulse $I_M$.

Figure 2B:
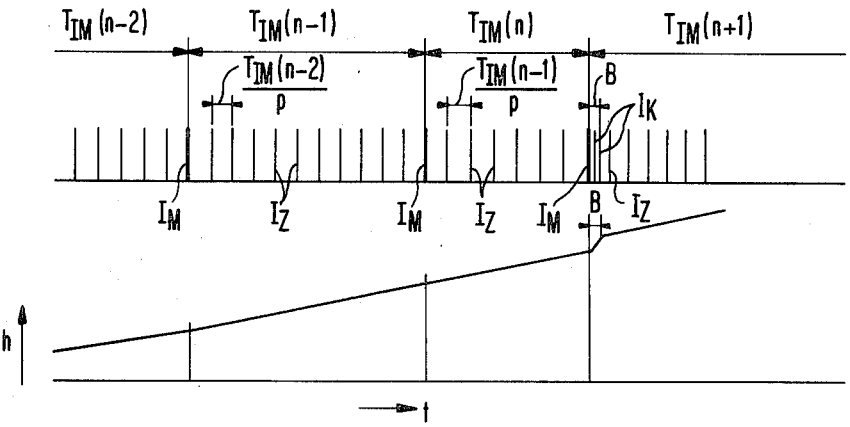

On the other hand, FIG. 2b presents the case where the period length $T_{IM}(n)$ during which the intermediate pulses $I_Z$ are distributed, is smaller than the previous period length $T_{IM}(n-1)$. In this case, according to this invention, the last of the intermediate pulses $I_Z$, that no longer have space when maintaining their prior determined time intervals $I_{IM}(n-1)/p$, within the current period $T_{IM}(n)$, are produced immediately subsequent to the appearance of the following measurement pulse $I_M$, in direct sequence during a time period B in the form of so-called correction pulses $I_K$, in a very small fraction of the subsequent period length $T_{IM}(n+1)$ and sufficiently ahead of the appearance of the first intermediate pulse $I_Z$ of this following period length $T_{IM}(n+1)$.

The movement of the carriage shift h as a function of time t that are also shown in FIGS. 2a and 2b. In the first case (FIG. 2a) a slight deviation of the curve from the continuous course while going through the residual period A, which is expressed in a time-wise very brief horizontal curve section A. In the second case (FIG. 2b), in the curve section B, a brief, i.e., nearly vertical rise of the shifting path h takes place by a however very small amount. But these two discontinuous deviations are so small that they cannot be determined on the final ground gear at all.

FIG. 3 presents a block diagram of the electronic differential 14 of FIG. 1 together with the linear encoder 11, controller 8, the angular encoders 3 and 7 and the motor 5 of the workpiece drive.

The linear encoder 11, which, according to FIG. 1, comprises an optical scale 12 and the reading head 13 of the carriage 9 which carries out sliding movements in both directions of the gear 6, produces travel information in the form of the pulses $I_M$ as rising or declining pulses to a corresponding increase-line 21, resp. a decrease-line 22 (FIG. 3). In the lines 21 and 22 a directional memory 23 is arranged, for instance a conventional, flip-flop, which stores the information as to whether the last measurement pulse $I_M$ was an upward or a downward pulse.

The upward and downward pulses $I_M$ of the linear encoder 11 are also fed to an OR-circuit 24 to the output of which is directed to lines 25, 26, 27 and 38.

A pulse generator 28 produces pulses of a constant frequency of, for example, 1 MHz. The pulses with the frequency $f_1$ are led to the input of the dividing counter 29, which counts the arriving pulses and which passes on a pulse to the subsequent counter 30 after each predetermined number of pulses. The division factor of the dividing counter 29, in this case, is equal to the previously mentioned factor p of the multiplication of the measurement pulses $I_M$. It may be in the range between 4 and 64, where the resulting enlargement of the resolution of the measurement pulses is only small for factors smaller than 4, and where for factors greater than 64 the electronic equipment becomes too expensive and the pulse measure errors make the high resolution uncertain.

Within counter 30, which serves for the measurement of the period duration, the current counting of the output pulses of the divider counter 29, in other words, the pulses with the frequency $f_1/p$, continues until the next measurement pulse $I_M$ appears. At this point in time, the content c of the counter is stored in a memory 31. For this purpose, the output that provides the counter position of counter 30 is connected to an AND-circuit 32, while line 25 is connected to another input of the AND-circuit 32, which line carries the measurement pulses $I_M$. By line 26, which also carries the measuring pulses $I_M$, both, the dividing counter 29 and the counter 30 are automatically cleared on the arrival of the measurement pulse $I_M$. Thus, for each period duration $T_{IM}(n)$ the measurement pulse by the factor p divided number of pulses with the frequency $f_1$ is counted and stored in memory 31, where they will be available, as will be described later, for the next period duration $T_{IM}(n+1)$, since only the measurement pulse $I_M(n+1)$ which follows the measurement pulse $I_M(n)$ which starts the counting, causes the transfer of the content c of the counter 30 into memory 31 and, at the same time, resets the counter 30 for the beginning of a new counting cycle.

From memory 31, the content c of the counter 30 is passed on to a further counter 33 which counts the provided pulses with the constant frequency $f_1$ and which provides an output pulse after the counting of a number c of pulses provided by the pulse generator 28 and is then reset, so that it again begins to count to c, again releases an output pulse, and so on. The output pulses of the counter 33, therefore, have a frequency $f_2 = f_1/c$, which, corresponding to the content c of counter 30 is variable because of the determination of the prior period duration of the measurement pulses. Conversely, the content c of counter 33 comprises counted pulses from the pulse generator 28, that were counted during the previous period duration $T_{IM}$ that were divided by the constant number p with the frequency $f_1$, i.e.:

$$c = \frac{f_1}{p} \cdot T_{IM} \quad (2)$$

As a result, the output pulses of counter 33 have a frequency $$f_2 = \frac{f_1}{c} = f_1 \cdot \frac{p}{f_1} \cdot \frac{1}{T_{IM}} = f_{IM} \cdot p \quad (3)$$

where $f_{IM}$ is the frequency of the measurement pulses.

Thus the output pulses of counter 33 form a pulse sequence with a frequency that is equal to the frequency of the measuring pulses multiplied by the constant factor p. In other words, the output pulse sequence of counter 33 comprises the sequence of the measurement pulses with $p-1$ intermediate pulses between each pair of subsequent measurement pulses, where the distance of the intermediate pulses in each period duration between measurement pulses is equal and specified on the basis of the previous period duration.

The output pulses of counter 33 are fed to an AND-circuit 34, an OR-circuit 35 and on line 36 to two AND-circuits 37 that have inputs on lines 21 and 22, and therefore are dependent on the switch condition of the directional memory 23 into one of lines 21 or 22.

In order to accomplish the condition that exactly $p-1$ intermediate pulses are present at the period duration of the measurement pulses, by providing for a pulse-free residual period A (FIG. 2a) for longer period durations, or, for a shorter period duration by interjecting the excessive intermediate pulses with higher frequency immediately after the beginning of the subsequent period duration, (FIG. 2b), along with the AND-circuit 34 and the OR-circuit 35, a control counter 39 and a further AND-circuit 40 with three inputs, are provided. The counting input of the control counter 39 is connected to line 36. The control input of control counter 39 for its reset to zero is connected by a further line 38 via line 27 to the output of OR-circuit 24 and, thus connected to the linear encoder 11. The output of control counter 39 is connected to an input of the AND-circuit 34 and with an input of AND-circuit 40. Control counter 39 is so constructed that it produces an output signal for so long, as it has not yet reached its counting capacity which corresponds to the specific, constant number p. In addition, the control counter 29 is so constructed, that its reset takes place through a measurement pulse $I_M$ of the feed measurement system by way of line 38, but only whenever it has reached or reaches its counting capacity which corresponds to the specific constant number p. The two further inputs of AND-circuit 40 are connected to the pulse generator 28, respectively by line 27 and the OR-circuit 24 with the feed measuring system 11.

Thus the output signals of counter 33 normally go by way of the AND-circuit 34 and the OR-circuit 35 to line 36 and, thus to the input of control counter 39, which, therefore, counts the output signals of counter 33. As soon as control counter 39 has reached its counting capacity p, it blocks the AND-circuit 34, so that no further output pulses of counter 33 reach lines 21 or 22. Only upon the following measurement pulse $I_M$, control counter 39 again releases AND-circuit 34, by being reset to zero by the measuring pulse. This process corresponds to the case presented in FIG. 2a.

However, if control counter 39 has not yet reached its counting capacity p on the arrival of the next measurement pulse $I_M$, then, upon the arrival of this next measurement pulse on line 27, the pulses of the pulse generator 28 with a frequency $f_1$ will be transmitted as correction pulses $I_K$ to OR-circuit 35 and, thus through line 36 to the input of control counter 39 and one of lines 21, 22. The control counter 39, thus continues to count until it has reached its counting capacity p, whereupon it is reset to zero and blocks the AND-circuit 40. Since frequency $f_1$ of the pulses of the pulse generator 28 is considerably higher than frequency $f_1/c$ of the output pulses of counter 33, the throughput of the pulses of the pulse generator 28 takes place long before the first output pulse of counter 33 arrives after the first measurement pulse.

This process, accordingly, corresponds to the case shown in FIG. 2b.

As already mentioned in connection with FIG. 1, the gear data, such as module m, number of teeth z and pitch helix angle $\beta$ must be considered for the determination of the value of the additional rotational movement of the gear workpiece. For this purpose, the pulse sequence that is carried on line 21 or 22 of counter 33 must be multiplied with the appropriate factor b, which is smaller than 1. For this purpose, as shown in FIG. 3, each adjustable multiplier 41 and 42 is switched into lines 21 and 22, where the multipliers are provided with an adjustment device 43. The number of digits of the multipliers 41, 42 that are known as so-called binary rate multipliers, determines the accuracy. In the present case, it is appropriate to provide for 18 binary digits.

Further attached to lines 21 and 22 of the upward or downward movement of the carriage is directional change-over switch 44, which comprises a logic gate. The directional change-over switch 44 can be switched by means of a setting device 45 in order to be able to account for the helical direction of the tooth gear workpiece, i.e., the direction of the pitch helix angle $\beta$ (FIG. 1). The directional change-over switch 44 has two output lines 46 and 47, which are referred to the direction of the additional rotational movement of the gear workpiece and of which line 46 represents the channel for the forward rotational movement and the other line 47, the channel for the reverse rotational movement of the gear workpiece. If, for example, the output signal of setting device 45 is at one of two binary levels, the change-over switch 44 will connect line 21 to line 46, and line 22 to line 47. If in the other case, the output signal of setting device 45 is at the other one of the two binary levels, the change-over switch 44 will connect line 21 to line 47, and line 22 to line 46.

The digital-incremental position information, which is in one of the two lines 46 and 47 in the form of pulse sequences $I_M \times p \times b$, concerning the workpiece carriage, is later resolved for the signal preparation for controller 8 of the positive movement control, by providing the controller 8 with a coarse position information in digital-incremental form, and a fine position information in analog form. This resolution takes place by means of a divider counter 48, which is connected to lines 46 and 47, which, in the present arrangement example, counts from zero to a specific constant number $p-1$ and, then, provides an output pulse to one of two output lines 49 and 50, that are connected to the controller 8. The resolution can also take place with any other factor. The content of counter 48 is provided to a digital-analog converter 51, which is connected to it and which then provides the corresponding analog signal to controller 8 by means of an output line 52, that is connected to controller 8.

Figure 4A:
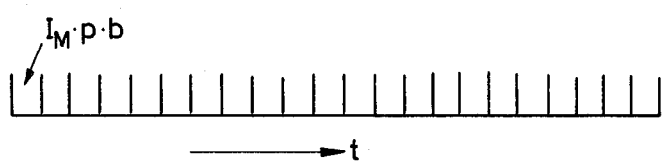
FIG. 4a is a graphic presentation of a pulse sequence produced in the device of FIG. 3.
Figure 4B:
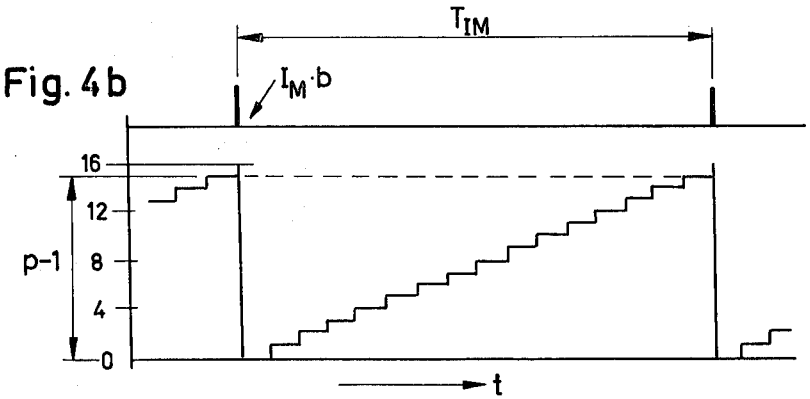
FIG. 4b is a graphic presentation of pulses derived from the pulse sequence of FIG. 4a, which are supplied to a controller of FIG. 1 as a rough position report.
Figure 4C:
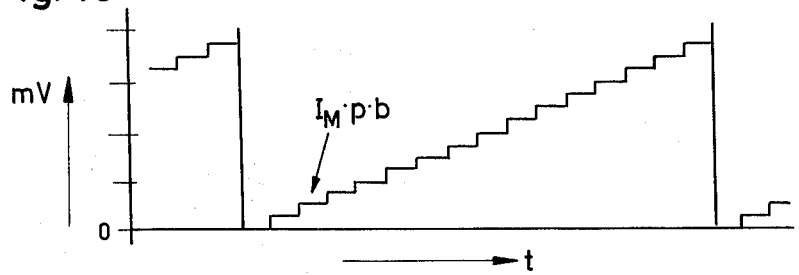
FIG. 4c is a graphic presentation of an analog signal derived from the pulse sequence of FIG. 4a, which is added as a fine position report to the controller of FIG. 1.

The described resolution of the position information of the directional change-over switch 44 through the divider counter 48 and the conversion of the fine position information into an analog signal by the digital-analog converter 51 is graphically presented in FIGS. 4a, 4b and 4c, as a function of time t, where it is assumed for the purpose of these presentations that the specific constant number p has the value 16, i.e., that 15 intermediate pulses are located between any two measurement pulses $I_M$. FIG. 4a shows the pulse sequence of the position information provided by the directional change-over switch 44, expressed by the measurement pulses $I_M$ that have been multiplied by factors p and b. FIG. 4b shows the coarse position information in which the dividing counter 48 only provides energy $p^{th}$, i.e. every 16th pulse to the controller 8 in digital-incremental form, which is expressed by pulses $I_M \times b$, it can be seen that the counter 48, in this case, counts from zero to $p-1=15$.

FIG. 4c shows the fine position information, in which all incoming pulses, expressed as $I_M \times p \times p$, are converted in the digital-analog converter 51 into a millivolt voltage, which is also supplied to controller 8.

The method as well as a device for the execution of this invention were described on the example of gear grinding according to the gear hobbing method. The same method and devices could, in similar manner, also be applied to hobbing of helical gears.

What is claimed is:

1. In a method for the production of an additional rotational movement of a helically toothed gear workpiece in an electronically controlled positive movement gear hobbing machine, said machine having separate turning drives for the tool and the workpiece, wherein sequences of pulses dependent upon the rotation of each drive are supplied to a controller, said pulses being compared to each other for the production of a control signal for the readjustment of the workpiece drive, with an additional signal supplied that is derived from the longitudinal feed of the workpiece with respect to the tool, the improvement comprising; producing measurement pulses dependent upon the longitudinal feed of the workpiece, producing a constant number of intermediate pulses after the beginning of every interval limited by two successive measurement pulses in time-wise at least approximately even sequence, the distance between the intermediate pulses during said limited interval being determined by the measurement of the length of the previous interval and of an at least approximately even distribution of a certain number of intermediate pulses with respect to the measured interval length, and providing in each interval that is longer than the previous one, a pulse-free interval section after the last of the intermediate pulses that have been produced with the specific number, and producing in each interval, which is shorter than the previous one, the excess intermediate pulses in the subsequent interval with a higher pulse sequence frequency between the measurement pulse forming the subsequent interval's beginning and the first subsequent intermediate pulse and in that the measurement pulses and intermediate pulses that are produced in all successive intervals are fed to the controller as an additional signal.

2. The method according to claim 1, wherein the specific constant number of the intermediate pulses is in the range of 3 to 63.

3. The method according to claim 1, wherein the measurement pulses and the intermediate pulses are produced in two separate channels, each channel selected according to the direction of movement of the longitudinal advance of the workpiece.

4. The method according to claim 3, wherein the sequence of the measurement pulses and the intermediate pulses are multiplied with a factor prior to their being supplied to the controller, said factor determined by the gear data of the gear to be processed, especially the module, number of teeth and pitch helix angle.

5. The method as in claim 4, wherein the sequence of measurement pulses and of the intermediate pulses multiplied with said factor are divided by a constant quotient, whereby the determined, constant number of intermediate pulses, is fed in digital-incremental form as a rough additional signal, and the sequence of the measurement pulses and of the intermediate pulses multiplied by the factor mentioned, are fed to the controller in analog form as a fine additional signal.

6. Apparatus for the production of an additional rotational movement of a helically toothed gear workpiece in an electronically controlled positive movement tooth gear hobbing machine, said machine having separate turning drives for the tool and the workpiece, a linear encoder for a longitudinally travelling carriage of the gear processing machine comprising an optical scale and an attendant reading head producing measurement pulses, the improvement comprising; a pulse generator for the production of pulses of constant frequency which is greater than the frequency of the measurement pulses, said measurement pulses being multiplied by the specific, constant number, first circuit means for the division of the pulses of the pulse generator by said constant number and for the counting of the divided pulses during an interval lying between the first and a second measurement pulse, second circuit means for the division of the pulses of the pulse generator in each interval by the count of the first circuit means, and third circuit means connected to said second circuit means for addition to the measurement pulses of pulses produced in the second circuit means, said third circuit means comprising gate circuits for blocking of the pulses of the second circuit means whenever the number of said pulses in the interval between the second and the third measurement pulse reaches a constant number or, said gate circuits adding the pulses of said second circuit means if the number of the pulses of the second circuit means does not reach the specific constant number in the interval between the second and the third measurement pulses.

7. Apparatus according to claim 6, wherein the first circuit means are connected to a divider, said divider is connected to the pulse generator as well as a counter in subsequence to said divider, both of which have a reset input connected to the travel measuring arrangement, and the counter is connected to a gate circuit, said gate circuit having a control input connected with the linear encoder and to the output of which a memory is connected in order to store the content of the counter at each occurrence of a measurement pulse.

8. Apparatus according to claim 7, wherein the second circuit means includes an adjustable divider connected to the pulse generator, said divider having an adjustment input for the dividing factor connected to the memory.

9. Apparatus according to claim 8, wherein the third circuit means includes a counter producing an output signal upon reaching the specific, constant number, said counter having an input connected with the output of the second circuit means and to whose output the control input of the first gate circuit is connected to the output of the second control means together with a first control input of a second gate circuit, which in turn is connected to the pulse generator and which contains a second control input that is connected to the linear encoder, wherein outputs of both of the gate circuits are brought together in a line that is connected between the output of the linear encoder and leads to the controller.

10. Apparatus according to claim 9, further comprising an adjustable multiplier arranged in the line leading from the linear encoder to the controller for the addition of the gear data as well as a directional change-over switch.

11. Apparatus according to claim 10, wherein the line leading from the linear encoder to the controller, corresponding to the direction of the longitudinal travel of the workpiece, or its helix direction, has two channels.

12. Apparatus according to claim 6, wherein the pulse sequence, containing the measurement pulses and the additional pulses is delivered to the controller through a divider in digital-incremental form and by way of a digital-analog converter in analog form.

* * * * *